US011760120B2

(12) United States Patent
Özyigit et al.

(10) Patent No.: US 11,760,120 B2
(45) Date of Patent: Sep. 19, 2023

(54) METHOD AND APPARATUS FOR DETECTION OF COUNTERFEIT AND/OR REUSED STAMPS

(71) Applicants: Ali Özyigit, Bonn (DE); Baris Cem Sal, Bonn (DE); Elisa Schneider, Cologne (DE); Marc Gittler, Cologne (DE)

(72) Inventors: Ali Özyigit, Bonn (DE); Baris Cem Sal, Bonn (DE); Elisa Schneider, Cologne (DE); Marc Gittler, Cologne (DE)

(73) Assignee: DEUTSCHE POST AG, Bonn (DE)

( * ) Notice: Subject to any disclaimer, the term of this patent is extended or adjusted under 35 U.S.C. 154(b) by 308 days.

(21) Appl. No.: 17/125,274

(22) Filed: Dec. 17, 2020

(65) Prior Publication Data
US 2021/0187992 A1   Jun. 24, 2021

(30) Foreign Application Priority Data
Dec. 18, 2019  (EP) ..................................... 19217513

(51) Int. Cl.
| G06K 9/00 | (2022.01) |
| B42D 25/29 | (2014.01) |
| B42D 25/309 | (2014.01) |
| B42D 25/318 | (2014.01) |
| B42D 25/382 | (2014.01) |

(Continued)

(52) U.S. Cl.
CPC ........... *B42D 25/29* (2014.10); *B42D 25/309* (2014.10); *B42D 25/318* (2014.10);
(Continued)

(58) Field of Classification Search
CPC .... B42D 25/29; B42D 25/309; B42D 25/318; B42D 25/382; B42D 25/387; G06D 7/00; G06T 7/0002; G07D 7/00
(Continued)

(56) References Cited

U.S. PATENT DOCUMENTS

2009/0115184 A1   5/2009  Delianski et al.
2009/0285448 A1   11/2009  Carpenter et al.
(Continued)

FOREIGN PATENT DOCUMENTS

CN   109 117 885 A   1/2019

OTHER PUBLICATIONS

Micenková, Barbora, Joost van Beusekom, and Faisal Shafait. "Stamp verification for automated document authentication." Computational forensics. Springer, Cham, 2012. 117-129. (Year: 2012).*

(Continued)

*Primary Examiner* — Jonathan S Lee
(74) *Attorney, Agent, or Firm* — Reinhart Boerner Van Deuren P.C.

(57) ABSTRACT

A method is disclosed which is performed by at least one first apparatus. In the method, information indicative of at least one characteristic of a franking is obtained. It is determined whether or not the franking is a counterfeit franking and/or a reused franking based on the obtained information or based on the obtained information and based on reference information indicative of at least one characteristic of a franking. The at least one characteristic includes at least one of a physical characteristic of the franking, a visual characteristic of an image provided on the franking, and/or a characteristic based on at least one material of the franking.

23 Claims, 5 Drawing Sheets

(51) Int. Cl.
*B42D 25/387* (2014.01)
*G06D 7/00* (2006.01)
*G06T 7/00* (2017.01)
*G07D 7/00* (2016.01)

(52) U.S. Cl.
CPC ......... *B42D 25/382* (2014.10); *B42D 25/387* (2014.10); *G06D 7/00* (2013.01); *G06T 7/0002* (2013.01); *G07D 7/00* (2013.01)

(58) Field of Classification Search
USPC ....................................................... 382/112
See application file for complete search history.

(56) References Cited

U.S. PATENT DOCUMENTS

| | | |
|---|---|---|
| 2011/0299726 A1 | 12/2011 | Lübben |
| 2012/0080525 A1 | 4/2012 | Cordery et al. |
| 2014/0168690 A1* | 6/2014 | Cowburn ................. G07D 7/01 |
| | | 358/1.14 |
| 2015/0369659 A1* | 12/2015 | Talyansky ............... B42D 25/36 |
| | | 250/341.1 |
| 2016/0133078 A1* | 5/2016 | Hussain ........... G06K 19/06028 |
| | | 235/494 |

OTHER PUBLICATIONS

Smith, Elisa H. Barney, and Gernot Fink. "Template generation from postmarks using cascaded unsupervised learning." Proceedings of the 3rd International Workshop on Historical Document Imaging and Processing. 2015. (Year: 2015).*

* cited by examiner

METHOD AND APPARATUS FOR DETECTION OF COUNTERFEIT AND/OR REUSED STAMPS

CROSS-REFERENCE TO THE RELATED PATENT APPLICATIONS

This patent application claims the benefit of European Patent Application No. 19217513.1 filed on Dec. 18, 2019, the entire teachings and disclosure of which are incorporated herein by reference thereto.

FIELD OF THE DISCLOSURE

The invention relates in general to the field of logistics, in particular to methods, apparatuses, systems and computer programs enabling detection of fake stamps.

BACKGROUND

Frankings such as postage stamps are used as an indication that postage has been paid for the delivery of a consignment unit. Usually, postage stamps are produced and issued by a government entity. Postage stamps can then be obtained by the public, e.g. at a post office, a postal vending machine or a postal selling point in a larger shop such as a supermarket. As in case of money, a problem exists in that postal stamps are used by criminals in illegal ways.

In particular, use of counterfeit or reused frankings such as stamps is a problem for mail delivery companies as delivery of consignment units with fake or reused stamps is a service without payment. Counterfeit stamps are fake stamps produced by criminal organizations to appear to correspond to genuine stamps. Reused stamps are genuine stamps that have been used one time legally, have been removed from a legally transported consignment unit and have been cleaned (essentially by removing a postmark or cancellation) before being used again on a further consignment unit to be transported by a mail delivery company.

SUMMARY OF SOME EXAMPLE EMBODIMENTS OF THE INVENTION

In existing logistics processes, consignment units are monitored typically at an early stage, e.g. at an initial sorting stage, where sorting machines may sort consignment units e.g. based on destination, size, type and/or weight. At this stage, consignment units are also checked for presence or absence of postage stamps and/or frankings to prevent consignment units without postage stamps and/or frankings, i.e. consignment units for which a corresponding postage has not been validly paid, to enter the logistics process. Corresponding monitoring of the consignment units is often carried out by the sorting machines which extract consignment units without postage stamp or franking or where franks or frankings are unreadable for the corresponding machine. For example, a sorting machine may have access to consignment units transported on a conveyor belt and may be configured to extract a consignment unit without stamp from the conveyor belt for manual inspection by a staff person. An extracted consignment unit may in this way then be subjected to a further manual check by the staff person. In case the staff person confirms that the extracted consignment unit has no valid stamp or franking, the corresponding consignment unit is then usually returned to the sender.

However, such manual check creates high additional costs. At the same time, fully automated processes which do not make use of such manual check and return the consignment unit already after having been extracted by the machine monitoring process, often lead to reduced customer satisfaction as a fraction of extracted consignment units is then returned even though a postage was validly paid but the corresponding postage stamp or franking was not recognizable for the corresponding machine.

It is inter alia an object of the invention to provide in particular methods, apparatuses, systems and computer programs to identify counterfeit or reused frankings used to control payment in logistics processes, e.g. postage stamps. A further object of the invention is to provide methods, apparatuses, systems and computer programs to improve precision in identifying counterfeit or reused frankings.

According to a first exemplary aspect of the invention, a method performed by at least one first apparatus is disclosed, the method comprising:

obtaining or causing obtaining information indicative of at least one characteristic of a franking;

determining or causing determining whether or not the franking is a counterfeit franking and/or a reused franking based on the obtained information or based on the obtained information and based on reference information indicative of at least one characteristic of a franking;

wherein the at least one characteristic comprises at least one of a physical characteristic of the franking;

a visual characteristic of an image provided on the franking;

a characteristic based on at least one material of the franking.

The method according to the first aspect of the invention may for instance be performed by an apparatus or by a system that comprises a plurality of apparatuses. The apparatus or system may for instance correspond to a mobile device and/or an apparatus configured for a logistics process and/or a network server.

According to a second exemplary aspect of the invention, a method performed by at least one second apparatus is disclosed, the method comprising:

obtaining or causing obtaining information indicative of at least one characteristic of at least one franking;

associating or causing associating the information indicative of the at least one characteristic of the at least one franking with reference information indicative of the at least one characteristic of a franking;

wherein the at least one characteristic comprises at least one of a physical characteristic of the franking;

a visual characteristic of an image provided on the franking;

a characteristic based on at least one material of the franking.

The method according to the second aspect of the invention may for instance be performed by an apparatus or by a system that comprises a plurality of apparatuses. The apparatus or system may for instance correspond to a mobile device and/or an apparatus configured for a logistics process and/or a network server.

For all aspects of the invention presented above (referred to as the "respective aspect" below), the following is disclosed:

A computer program according to the respective aspect of the invention, the computer program when executed by a processor causing an apparatus or system to perform or control the method according to the respective aspect of the invention.

A computer readable storage medium according to the respective aspect of the invention, in which the computer program according to the respective aspect of the invention is stored. The computer readable storage medium could for example be a disk or a memory or the like. It may for instance be tangible and/or non-transitory. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

An apparatus according to the respective aspect of the invention, which is configured to perform or comprises respective means for performing or controlling the method according to the respective aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means.

An apparatus according to the respective aspect of the invention, comprising at least one processor and at least one memory including computer program code, the at least one memory and the computer program code configured to, with the at least one processor, cause an apparatus (e.g. the apparatus according to the respective aspect of the invention) at least to perform or control the method according to the respective aspect of the invention.

A system according to the respective aspect of the invention, the system comprising a plurality of apparatuses and configured to perform or comprises respective means for performing or controlling the method according to the respective aspect of the invention.

The disclosed apparatus according to any aspect of the invention may be a module or a component for a device, for example a chip and/or processor. Alternatively, the disclosed apparatus according to any aspect of the invention may be a device, for instance a network server or other electronic device. The disclosed apparatus according to any aspect of the invention may comprise only the disclosed components (e.g. means) or may further comprise one or more additional components.

Furthermore, according to a third aspect of the invention, a system is disclosed, the system comprising an apparatus or system according to the first aspect of the invention and an apparatus or system according to the second aspect of the invention.

In other words, a system is disclosed that may comprise:
at least one apparatus (e.g. the at least one second apparatus) configured for:
obtaining or causing obtaining information indicative of the at least one characteristic of at least one franking;
associating or causing associating the information indicative of the at least one characteristic of the at least one franking with reference information indicative of the at least one characteristic of a franking; and
at least one further apparatus (e.g. the at least one first apparatus) configured for:
obtaining or causing obtaining information indicative of at least one characteristic of a further franking;
determining or causing determining whether or not the further franking is a counterfeit franking and/or a reused franking based on the obtained information or based on the obtained information and based on reference information indicative of at least one characteristic of the franking;
wherein the at least one characteristic comprises at least one of
a physical characteristic of the franking;
a visual characteristic of an image provided on the franking;
a characteristic based on at least one material of the franking.

One or more of the features and/or embodiments disclosed in the following may further define the first and/or second aspect of the invention.

The method according the first aspect may exemplarily be understood as a method for determining whether or not the franking is a counterfeit franking and/or a reused franking based on the information and/or based on the reference information. The method according to the second aspect may for example be understood as a method relating to making available and/or generating reference information.

It is noted that in the context of the present disclosure, a franking refers to any device, marking, or combinations thereof (which may be referred to as franks) applied to consignment units of any class which qualifies them to be postal serviceable. Thus, in an exemplary embodiment, the franking is a franking provided on a consignment unit, e.g. on a parcel or a letter. For example, in an exemplary embodiment, a franking is an uncanceled and/or precanceled postage stamp. In addition or alternatively, in an exemplary embodiment, a franking is a self-adhesive postage stamp or a postage stamp comprising adhesive gum.

The method according to the first aspect may be carried out at any suitable stage of a logistics process, for example at any stage of a process of shipping a consignment unit to a receiver. For example, the method may be performed at an early stage of a logistics process, e.g. at a sorting stage performed by one or more sorting machines. Thus, in an exemplary embodiment, the at least one first apparatus corresponds to or is comprised by a logistics apparatus (an apparatus configured for logistics processes) such as a sorting machine of a logistics service provider company. A further example of a logistics apparatus used in an early stage of a logistic process is a franking machine.

In an exemplary embodiment, obtaining or causing obtaining information indicative of at least one characteristic of a franking comprises acquiring or causing acquiring an image of at least part of the franking. To this end, in an exemplary embodiment, the at least one first and/or second apparatus comprises a camera and/or is connected (electrically and/or mechanically) with a camera.

For example, the at least one first and/or second apparatus may in an exemplary embodiment correspond to or be comprised by a digital camera fixedly and/or removable installed at an early stage of a logistics process and comprising and/or connected with one or more processors (e.g. of a data processing apparatus such as a stationary or portable computer) for performing the method according to the first and/or second aspect (in other words, the at least one first and/or second apparatus may comprise the digital camera and the one or more processors and/or the processing apparatus).

In an exemplary embodiment, the at least one first and/or second apparatus corresponds to or is comprised by a mobile device, e.g. a smartphone, a tablet computer, a laptop, comprising or being connected with a digital camera. In a further or alternative embodiment, the at least one first and/or second apparatus corresponds to or is comprised by a robot and/or an Unmanned Aerial Vehicle (UAV), in particular a drone, e.g. being used in a logistics center and/or warehouse and comprising a camera configured for acquiring an image of a franking. Further, the at least one first apparatus may correspond to a server, server system, server cloud or cloud system, e.g. comprising a camera connected therewith e.g. via a communication path as disclosed further herein.

In an exemplary embodiment, the at least one first and/or second apparatus may in particular comprise a logistics apparatus (e.g. a sorting machine and/or a franking machine) comprising a camera and/or a logistics apparatus and a mobile device comprising a camera, wherein the mobile device is removable mounted to the logistics apparatus. To this end, in an exemplary embodiment, the logistics apparatus comprises a holder configured for holding the mobile device. In an exemplary embodiment, the holder is configured for holding the mobile device such that an angle between an optical axis of a digital camera comprised by the mobile device and a surface of a franking of a consignment unit processed by the logistics apparatus is 10° to 95°, in particular 12° to 93°, in particular 15° to 90°. For example, the logistics apparatus may comprise or may be mounted or installed in the vicinity of a conveyor belt transporting consignment units to be processed by the logistics apparatus (e.g. at a sorting stage). It turned out that by aligning a mobile device camera for acquiring images of a franking in this angle range, meaningful images can be obtained from which information can be suitably derived.

According to the invention, the information and/or the reference information are indicative of at least one characteristic of a franking (e.g. a franking under inspection in case of the information and/or a franking in case of the reference information). Thereby, the at least one characteristic may be a physical characteristic of the franking. In an exemplary embodiment, a physical characteristic of the franking comprises a physical characteristic of a cutting edge of a franking, in particular of a postage stamp. For example, in an exemplary embodiment, a physical characteristic of a cutting edge of a franking comprises one or more of the following and/or is representative of one or more of the following: presence or absence of a perforation of the cutting edge; type and/or geometry of perforation of the cutting edge; whether or not the cutting edge is die-cut; whether or not the cutting edge is of serpentine die-cut shape, in particular having peak-type and/or valley-type corners, in particular being of sawtooth-type and/or of rounded type; sharpness of the cutting edge; and geometry of the cutting edge.

Thereby, for example, more traditional frankings such as postage stamps may comprise perforated edges that allow removing individual stamps from a group of stamps mutually connected to each other at the perforated edges. Newer frankings such as newer postage stamps are often die-cut. Die-cutting is a method of separating stamps, in particular of separating self-adhesive stamps. Self-adhesive stamps may be provided in booklet or coil form and may be removable attached to a backing paper. For separating individual stamps, a metal die cuts through the stamp paper while leaving the backing paper intact. As a result, individual stamps may be peeled off the backing paper, leaving the unused stamps in the booklet or coil. While a die for die-cutting the stamps may in principle be designed to cut out arbitrary shapes, cutting edges produced by a certain die used by an authorized stamp manufacturer turned out to be suitable to serve recognizing a franking to be from an authorized manufacturer and are in this way suitable to distinguish between genuine stamps produced by the authorized manufacturer and counterfeit stamps produced in a different way.

Such physical characteristic of the franking (information indicative of the physical characteristic) may be used as a reference characteristic (reference information) for example by averaging and/or by subjecting one or more frankings that are known to be from an authorized manufacturer (sample frankings) to a machine-learning and/or artificial intelligence process to determine an average of such characteristic.

For example, a certain number of sample frankings, e.g. of postage stamps, e.g. one to ten thousand, produced by an authorized manufacturer may be used to generate reference information indicative of a physical characteristic of a cutting edge of a franking. To this end, for example, images may be acquired of the certain number of sample frankings and may be subjected to an averaging process to generate the reference information as average information (average sharpness, average geometry, etc.) indicative of a franking. In similar fashion different average characteristics common to a larger number of frankings may be determined.

In an exemplary embodiment, the averaging process may comprise employing a machine learning algorithm, in particular based on artificial intelligence, which turned out to advantageously reduce a required number of sample frankings to achieve a desired degree of precision. It is noted that generation of the reference information may be performed by the at least one first apparatus and/or by the at least one second apparatus.

The method according to the first aspect may thus enable recognizing a counterfeit franking based on physical characteristics of a cutting edge e.g. by comparing a characteristic of a franking under inspection to the characteristic obtained by the averaging process based on frankings known to be non-counterfeit frankings. Thus, in an exemplary embodiment, determining whether or not the franking is a counterfeit franking and/or a reused franking based on the information or based on the information and based on reference information indicative of at least one characteristic of a franking comprises comparing or causing comparing the information indicative of the at least one characteristic of the franking to reference information indicative of the at least one characteristic of the franking. For example, the latter may in an exemplary embodiment comprise or correspond to comparing or causing comparing information indicative of a physical characteristic of a cutting edge of the franking to reference information indicative of the physical characteristic of a cutting edge of a corresponding franking. Thereby, corresponding franking is to be understood as indicating a franking of same type (e.g. a stamp of same monetary value, being characterized by a same imprint as the stamp under inspection).

Further examples of physical characteristics of a franking that may be employed in a same way as the physical characteristic of the cutting edge include in an exemplary embodiment a geometrical shape of the franking (e.g. an aspect ratio of long and short sides of a rectangular postage stamp), die cuts within the body of a franking, differences in geometry of perforations present along different sides of a franking, evenness of edges of a franking. Any of or any combination of such physical characteristics of a franking may be subjected to an averaging process to generate reference information as described and may be used to determine whether or not a franking under inspection is a counterfeit franking.

According to the invention, the at least one characteristic may in addition or alternatively comprise a visual characteristic of an image provided on the franking. An image imprinted on a franking such as a postage stamp may comprise name of a nation having issued the franking, a denomination of its monetary value, and/or one or more illustrations of persons, events, institutions, natural realities. Such image is usually provided by an authorized manufacturer (in Germany e.g. the Bundesdruckerei) onto a special custom-made paper using a printing process of recognizable quality (e.g. of particularly high quality). The combination of printing process and employed paper often results in unique visual characteristics which are (e.g. when averaged over a certain number of frankings) recognizable and unique at least for a respective type of franking. In an exemplary embodiment, a visual characteristic of an image provided on the franking comprises or is represented by: image resolution; span of used colors; image sharpness; image contrast; printing quality on pixel level; printer fingerprint on pixel level; completeness of an image; position of an image with respect to the franking; and image damage.

Thereby, in particular image resolution, span of used colors, image sharpness, image contrast, printing quality on a pixel level and printer fingerprint on a pixel level are parameters particularly suitable to characterize a printer of an authorized manufacturer and/or a printing process carried out by an authorized manufacturer. For example, an image resolution may be derivable from an image imprinted e.g. onto a postage stamp and may be representative of a resolution employed by a printer of an authorized manufacturer. Similarly, a span of used colors may in certain cases correspond to or be representative of a color space employed by or at a printer of an authorized manufacturer. In the same way, image sharpness and image contrast may be representative for such printer, e.g. may be only reachable by a high quality printer potentially available only to a restricted number of entities. Further, a particular printer may produce a unique pattern on a pixel level (printer fingerprint) which may be derivable from an image acquired from a franking. Such parameters (by themselves or in any combination) may be employed to determine whether or not a franking originates from a printer of an authorized manufacturer or from a criminal entity.

Completeness of an image, position of an image with respect to the franking and image damage are further exemplary characteristics which may be used to determine whether or not a franking is from an authorized manufacturer as non-authorized manufacturers often employ printing equipment of poor quality such that counterfeit frankings may often inhibit such imperfections.

As in case of the physical characteristic of the franking discussed above, also in case of the visual characteristic of an image provided on the franking, an averaging process potentially employing machine learning and/or artificial intelligence may be employed to generate reference information.

Further, as in the case of the physical characteristic, the method according to the first aspect may thus additionally or alternatively enable recognizing a counterfeit franking based on a visual characteristic of an image provided on the franking, e.g. by comparing a characteristic of a franking under inspection to the characteristic obtained by the averaging process based on frankings known to be non-counterfeit frankings. Thus, in an exemplary embodiment, determining whether or not the franking is a counterfeit franking and/or a reused franking based on the information or based on the information and based on reference information indicative of at least one characteristic of a franking comprises comparing or causing comparing information indicative of a visual characteristic of an image provided on the franking to reference information indicative of the visual characteristic of an image provided on a corresponding franking. Thereby, as in the case discussed above, corresponding franking is to be understood as indicating a franking of same type (e.g. a stamp of same monetary value, being characterized by a same imprint as the stamp under inspection).

According to the invention, the at least one characteristic may in addition or alternatively comprise a characteristic based on at least one material of the franking. A franking such as a postage stamp may correspond to an image imprinted onto a piece of recognizable paper. While paper used for manufacturing of frankings may in principle be available to the public, a particular piece of paper may become unique after it is identified (e.g. on a micro level) by means of a method in accordance with any of the aspects disclosed herein. Being identified in this way, it can be determined whether or not the paper is purchased and/or used for manufacturing of frankings e.g. by an authorized manufacturer such as e.g. the Bundesdruckerei.

In other words, characteristics of paper used for manufacturing a franking may provide an indication whether or not a franking under inspection has been manufactured by an authorized manufacturer. For example, paper material used for manufacturing a franking usually has a typical structure, which may be recognizable as surface structure, with characteristics suitable for identifying a certain type of paper. As in case of the cutting edge described above, a certain number of sample frankings (e.g. camera images acquired thereof) may be subjected to the described averaging and/or machine-learning process to generate reference information indicative of a structure, in particular of a surface structure, of a franking. In this way, by comparing a surface structure of a franking under inspection (information indicative of at least one characteristic of a franking) with a so generated reference surface structure (reference information indicative of at least one characteristic of a franking) a paper quality used for manufacture of the franking under inspection may be determined and it may thus be judged whether or not the franking under inspection is a genuine franking based on the determined paper quality. Thus, in an exemplary embodiment, the characteristic based on the at least one material of the franking may comprise or correspond to a structure, in particular to a surface structure, of a paper used for manufacturing the franking.

Further, an image comprised by the franking may be at least partially be printed using special ink, e.g. fluorescent and/or superfluorescent ink. In other words, in an exemplary embodiment, a material of a franking comprises fluorescent and/or superfluorescent ink. Such ink may be specific and only or essentially only be accessible to an authorized manufacturer of a franking. Therefore, presence or absence of fluorescent and/or superfluorescent ink may provide a further indication whether or not a franking under inspection has been manufactured by an authorized manufacturer. Thus, in an exemplary embodiment, the characteristic based on the at least one material of the franking may comprise or correspond to presence and/or absence of a fluorescence and/or superfluorescent ink in at least part of an image provided on a surface of the franking.

Thereby, an image or part thereof imprinted on a surface of a franking using such fluorescent and/or superfluorescent ink may become visible only under irradiance of ultraviolet (UV) and/or infrared (IR) light. Thus, in order to determine whether or not such ink is present in at least a part of an image imprinted onto a surface of a franking, in an exemplary embodiment, obtaining information indicative of at least one characteristic of a franking comprises acquiring at least one image of a surface of the franking in an ultraviolet and/or in an infrared wavelength range. To this end, a franking under inspection may be for example with UV light and/or with IR light and an image may be acquired using the light emitted from the illuminated franking. Thereby, images in the UV and IR ranges may be taken sequentially (e.g. if time allows) or simultaneously, whereby the latter may allow for a fast processing of multiple frankings in a shorter time. Further, in the latter case, a franking may be illuminated with white light encompassing the UV and IR ranges, while images resulting from UV and IR radiation may be acquired simultaneously under different angles (e.g. using two cameras optionally with respective color filters filtering light emitted as consequence of UV or IR irradiation of the franking). It turned out that in particular inspection using UV and/or IR light provides a beneficial means to determine whether or not a franking has been manufactured by an authorized manufacturer as non-genuine ink used by a non-authorized manufacturer, even if the non-authorized manufacturer attempts to copy the effects of genuine ink used by an authorized manufacturer, acts differently in a recognizable way under UR and/or IR radiation. It is noted that in an exemplary embodiment, an ultraviolet wavelength range comprises wavelengths smaller than 450 nm, in particular wavelengths in between 100 nm and 400 nm. It is further noted that in an exemplary embodiment, an infrared wavelength range comprises wavelengths larger than 780 nm, in particular wavelengths in between 800 nm and 1 mm.

Examples of fluorescent inks include ink that appears in a certain color if irradiated in a certain wavelength range and appears in a different color if irradiated in a different wavelength color. In this way, fluorescent ink may be suitable as indication if a franking is manufactured by an authorized manufacturer (i.e. is not counterfeit) or not. Thus, a color appearance of a franking may depend on a wavelength of light used for irradiating the franking. In other words, the characteristic based on the at least one material of the franking may in an exemplary embodiment further comprise a color appearance of the franking depending on a wavelength of light used for illuminating the franking.

A further example of a characteristic based on the at least one material of the franking is a residue of a material present e.g. on a surface of the franking. For example, if persons intend to reuse a franking such as a postage stamp, indications of prior use of the postage stamp are removed, in particular a postmark used for cancelling a postage stamp is removed. Such removal usually results in residues of corresponding cleaning chemicals used for the removal process such that presence of such unexpected chemicals on a surface of a postage stamp may provide an indication that the corresponding franking has already been used and that its reuse is illegal. Thus, the characteristic based on the at least one material of the franking may in an exemplary embodiment further comprise presence of at least one unexpected material, in particular of a cleaning material.

As in the case of the physical characteristic, the method according to the first aspect may thus additionally or alternatively enable recognizing a counterfeit franking based on a characteristic based on the at least one material of the franking, e.g. by comparing a characteristic of a franking under inspection to the characteristic obtained by the averaging process based on frankings known to be non-counterfeit frankings.

Thus, in an exemplary embodiment, determining whether or not the franking is a counterfeit franking and/or a reused franking based on the information or based on the information and based on reference information indicative of at least one characteristic of a franking comprises comparing or causing comparing information indicative of a characteristic based on the at least one material of the franking to reference information indicative of the characteristic based on the at least one material of the franking. Thereby, as in the case of the physical characteristic disclosed above, corresponding franking is to be understood as indicating a franking of same type (e.g. a stamp of same monetary value, being characterized by a same imprint as the stamp under inspection).

It is noted that in addition to being suitable as indications whether or not a franking is from an authorized manufacturer, any of the above disclosed characteristics may be employed as indication whether or not a franking has been used before (is a reused franking). For example, in an exemplary embodiment, physical characteristics of the franking include damages (e.g. tears, ruptures, rips, missing parts, etc.) of the franking which may for example be a result of removing the franking from a shipped consignment unit. Further, in an exemplary embodiment, a visual characteristic of an image provided on the franking may comprise damage and/or a deterioration of the image, e.g. a faded image, or an image with removed and/or blurred portions, which may result from a cleaning process of a used stamp and/or from a process of removing a used stamp from a shipped consignment unit. In addition, also for example a structure of a paper, i.e. an example of a material characteristic, may be changed as a result of application e.g. of cleaning chemicals or the like.

Thus, by comparing information indicative of the at least one characteristic to reference information e.g. generated using the disclosed averaging and/or machine learning process, it becomes possible to determine whether or not a franking is genuine and/or has been already used.

Thereby, to reproducibly quantify the comparing, it turned out that one or more thresholds may suitably be predefined. For example, the information indicative of the at least one characteristic may be represented by a corresponding predefined parameter value which may be defined for each and/or for each combination of the above disclosed categories (physical characteristic, visual characteristic, material characteristic) and examples of characteristics as corresponding representative. For example, a physical characteristic of a cutting edge of a franking may translate into an observable of an image acquired from the corresponding franking (e.g. contrast, sharpness, etc.) which may be suitably quantified as a parameter value. In a similar fashion also further characteristics may e.g. translate into an observable of an image which may be suitably quantified by a parameter value. Thus, in an exemplary embodiment, comparing the information indicative of the at least one characteristic of the franking to reference information indicative of the at least one characteristic of the franking comprises determining or causing determining whether or not a difference between a parameter value representative of the information indicative of the at least one characteristic of the franking and a parameter value representative of the reference information indicative of the at least one characteristic of the franking is larger or smaller than a predefined threshold.

Thus, in an exemplary embodiment, comparing information indicative of a physical characteristic of a cutting edge of the franking to reference information indicative of the physical characteristic of a cutting edge of a corresponding franking comprises determining or causing determining whether or not a difference between a parameter value representative of the information indicative of the physical characteristic of a cutting edge of the franking and a parameter value representative of the reference information indicative of the physical characteristic of a cutting edge of a corresponding franking is larger or smaller than a predefined threshold.

In addition or alternatively, in an exemplary embodiment, comparing information indicative of a visual characteristic of an image provided on the franking to reference information indicative of the visual characteristic of an image provided on a corresponding franking comprises determining or causing determining whether or not a difference between a parameter value representative of the information indicative of a visual characteristic of an image provided on the franking and a parameter value representative of the reference information indicative of the visual characteristic of an image provided on a corresponding franking is larger or smaller than a predefined threshold.

In addition or alternatively, comparing information indicative of a characteristic based on the at least one material of the franking to reference information indicative of the characteristic based on the at least one material of the franking comprises determining or causing determining whether or not a difference between a parameter value representative of the information indicative of a characteristic based on the at least one material of the franking and a parameter value representative of the reference information indicative of the characteristic based on the at least one material of the franking is larger or smaller than a predefined threshold.

The above described averaging process, in particular employing machine learning and/or artificial intelligence, suitably enables generating reference information for any (and/or for any combination) of the above disclosed categories (physical characteristic, visual characteristic, material characteristic) and examples of characteristics. As mentioned, hundreds, thousands or even tens of thousands of sample stamps known to be from an authorized manufacturer may be used to identify mean or reference characteristics which are suitable to determine whether or not a franking under inspection is from an authorized manufacturer and/or is used for the first time. Thus, in other words, in an exemplary embodiment, reference information indicative of at least one characteristic of a franking comprises or corresponds to average information indicative of the at least one characteristic of the franking.

In addition or alternatively, any (and/or any combination) of the above disclosed categories and examples of characteristics may be employed as unique identification of an individual franking (also referred to as fingerprint of the individual franking herein), e.g. of an individual postage stamp. Such unique identification of an individual franking is a further example of reference information. In other words, in an exemplary embodiment, reference information indicative of at least one characteristic of a franking comprises or corresponds to at least one unique characteristic of the franking.

For example, paper material used for manufacturing a franking usually has a certain unique random surface structure which is suitable to uniquely identify a corresponding individual franking. For example, an image may be acquired of an individual franking and information representative of the surface structure (e.g. a surface pattern) of the franking may be derived from the image. It is noted that any (and/or any combination) of the above disclosed categories and/or examples of characteristics may be derived from an image acquired from the franking and may serve to uniquely identify an individual franking. In other words, the at least one unique characteristic of the franking may serve as fingerprint for uniquely identifying an individual franking.

In an exemplary embodiment, the at least one characteristic may be derived from an acquired image employing a characteristic information generating method (in an exemplary embodiment an algorithm configured for bijective mapping an image to a unique sequence of characters, e.g. letters and/or numbers) for mapping an acquired image to a unique sequence of characters. Thus, in an exemplary embodiment, a fingerprint (the at least one characteristic of the franking) of a franking may be converted into a unique sequence of characters (e.g. letters and/or numbers).

Such fingerprint of a franking may be acquired at an early stage of a logistics process, e.g. at a sorting stage performed by the one or more sorting machines. Alternatively or in addition, such fingerprint may be acquired before a logistics process is performed, e.g. at a stage of manufacturing the franking at the authorized manufacturer (e.g. in Germany at the Bundesdruckerei).

Reference information generated based on the above described averaging process and/or reference information in form of a fingerprint of the individual franking may be stored (e.g. in combination with further information such as further identifying information of the corresponding franking) at a dedicated storage device of and/or connected to a data processing apparatus (e.g. at the at least one first and/or second apparatus) and/or at a network server, a network server system, a cloud or a cloud system connected with the at least one first and/or second apparatus via a communication path. In this way, a reference information database can be created which may be accessible by the at least one first and/or the at least one second apparatus via the communication path. For example, such reference information database may be an online database accessible by the at least one first and/or second apparatus via an internet connection (wired and/or wirelessly) and/or may be an offline database stored on a suitable storage medium which is accessible to the at least one first and/or second apparatus (e.g. a storage medium statically installed at the at least one first and/or second apparatus such as a hard disc drive and/or a storage medium of a different data processing device to which the at least one first and/or second apparatus via may have access and/or a storage medium removable held at the at least one first and/or second apparatus).

It is noted that in the context of the present disclosure, a communication path corresponds to or comprises a direct or indirect communication path, e.g. a network connection. For example, the communication path may comprise one or more hops, for example one or more communication links or communication connections. In the context of the present disclosure, communication path is to be understood as a (bi-directional) wireless and/or wired communication connection, in particular a 2G/3G/4G/5G cellular wireless connection, a Device-to-Device (D2D) communication path, a (bi-directional) wireless communication connection, in particular a Wireless Local Area Network (WLAN) connection and/or a wired connection including a Local Area Network (LAN) connection, and/or any further wired computer connection, e.g. a bus, in particular a USB connection, and/or in particular an internet connection.

Based on the stored fingerprint (based on the at least one unique characteristic of the franking, in particular stored in advance), it may be determined e.g. at the sorting stage of a logistics process, whether or not a franking currently used on a consignment unit has been already used before. For example, in case a franking is used for the first time, corresponding information may be stored in combination with the franking (e.g. a flag, e.g. in the reference information database) indicating that the franking has been used. If in a later sorting process the franking is found a second time, a corresponding consignment unit may be extracted from the logistics process as the corresponding franking is reused. In other words, in an exemplary embodiment the method according to the first aspect comprises extracting or causing extracting a consignment unit to which the franking is applied from a logistics process if it is determined that the franking is a counterfeit franking and/or has been used before.

While the method according to the first aspect may be understood as a method for determining whether or not a franking is a genuine franking manufactured by an authorized manufacturer and/or a franking used for the first time, the method according to the second aspect may for example be understood as a method relating to making available and/or generating reference information (e.g. the reference information generated by the disclosed averaging method and/or the fingerprint of a franking).

To this end, the at least one second apparatus may correspond to or comprise a mobile device, an apparatus configured for a logistics process, in particular a sorting machine and/or a franking machine, a robot, an Unmanned Aerial Vehicle and/or a network server, a network server system, a cloud or a cloud system. It is noted that in an exemplary embodiment, the at least one second apparatus is connected with the at least one first and/or second apparatus via the communication path. In an exemplary embodiment, the at least one apparatus may comprise or may be connected with a camera, e.g. a digital camera. As in case of the method according to the first aspect, obtaining information indicative of at least one characteristic of a franking may thus be understood as or comprise acquiring an image (e.g. using the camera) of the franking. In the method according to the second aspect, the at least one characteristic comprises at least one of the physical characteristic of the franking; the visual characteristic of an image provided on the franking; and/or the characteristic based on at least one material of the franking as discussed in connection with the respective embodiments in relation with the method according to the first aspect.

In one exemplary embodiment, associating the information indicative of the at least one characteristic of the at least one franking with reference information indicative of the at least one characteristic of a franking comprises storing or causing storing (e.g. at the reference information database) the information indicative of the at least one characteristic of the at least one franking as reference information in association with identification information of the respective at least one franking; and/or providing or causing providing the information indicative of the at least one characteristic of the at least one franking as reference information in association with identification information of the respective at least one franking to be accessible by the at least one external apparatus (e.g. to be used for stamp inspection and/or to be stored at the reference information database at the at least one external apparatus). Identification information of a franking may e.g. be a sequence number or the like provided on a surface of the franking and being derivable by the at least one first and/or second apparatus employing optical character recognition (OCR).

For example, at an early stage of a logistics process (e.g. at a sorting stage) and/or at a manufacturing stage of a franking, the at least one second apparatus (an apparatus at the manufacturing process, e.g. a mobile device and/or an apparatus configured for the logistics process and/or a mobile device and/or a camera) may acquire an image of a newly manufactured franking and/or of a franking on a consignment unit entering the logistics process. Information indicative of at least one characteristic of the franking may be derived from the image as disclosed above (e.g. employing the characteristic information generating method). Such information may then be stored as reference information indicative of the at least one characteristic of the franking at the at least one second apparatus in association with corresponding identification information of the franking to in this way associate the information indicative of the at least one characteristic of the franking with the reference information indicative of the at least one characteristic of a franking. By performing the latter storing for plural frankings, the reference information database may be built up.

Alternatively or in addition, the information may be held available as reference information in association with corresponding identification information of the franking to be accessible by an external apparatus. For example, to this end, the information may be transmitted as reference information in association with corresponding identification information to the external apparatus which may correspond to a data processing apparatus (e.g. the at least one first apparatus and/or to a network server and/or network cloud) connected to a suitable storage for holding available (e.g. storing at the reference information database) the reference information, e.g. as fingerprint of the franking, in association with the corresponding identification information for later use.

Accordingly, in an exemplary embodiment, the method according to the first aspect comprises receiving or causing receiving the reference information indicative of the at least one characteristic of a franking from at least one external apparatus in association with identification information of the franking from an external apparatus. Thereby, the external apparatus may correspond to the at least one second apparatus and/or to the network server and/or network cloud. In an exemplary embodiment, the reference information is transmitted in association with the identification information via the communication path disclosed above, in particular via the internet.

By associating the information indicative of the at least one characteristic with the identification information in this way, it becomes possible to determine whether or not a franking has been already used as disclosed above.

In an alternative or additional exemplary embodiment, associating the information indicative of the at least one characteristic of the at least one franking with reference information indicative of the at least one characteristic of a franking comprises providing or causing providing averaged information as reference information indicative of the at least one characteristic of the at least one franking based on information indicative of the at least one characteristic of a plurality of frankings. In other words, the second method may generate the reference information as information of an averaged or mean characteristic as disclosed above employing the above disclosed averaging method. In an exemplary embodiment, providing averaged information comprises employing or causing employing a machine learning algorithm, in particular based on artificial intelligence.

As mentioned, reference information including the reference information representing one or more unique characteristics of an individual franking and/or average information may be stored at the at least one second apparatus and/or at a network server, a network server system, a cloud or a cloud system corresponding to and/or being accessible the at least one first and/or second apparatus via a communication path. To be stored and/or to be employed, the reference information generated based on such averaging may be transmitted to an external apparatus such as the at least one first apparatus and/or to a network server, a network server system, a cloud or a cloud system connected with the at least one first and/or second apparatus via a communication path. Thus, in an exemplary embodiment, the method comprises storing or causing storing the reference information; and/or providing or causing providing the reference information to be accessible by the at least one external apparatus.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

Figure 1:
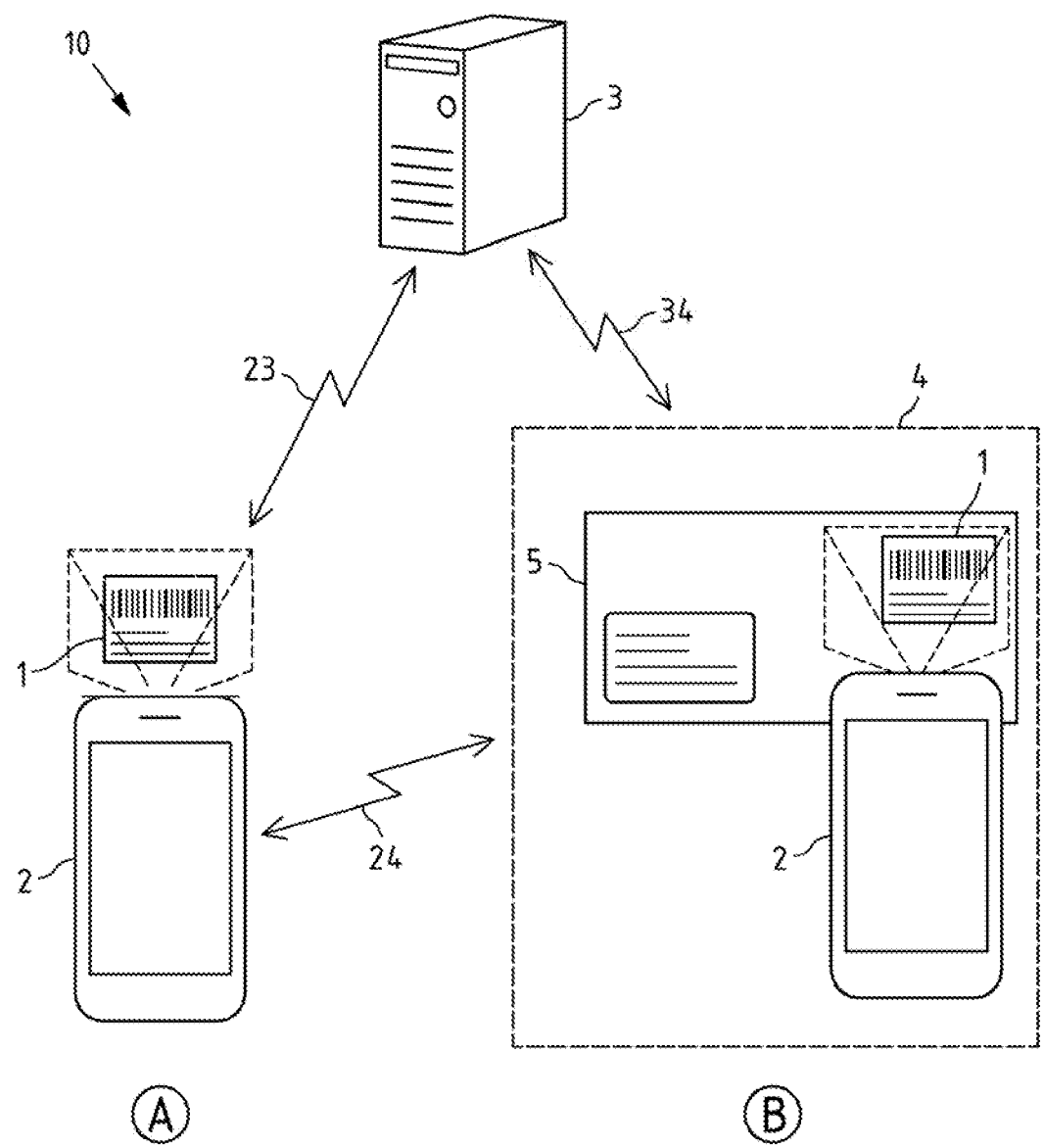
FIG. 1 is a block diagram of an exemplary embodiment of a system according to the invention.

FIG. 1 is a schematic illustration of an example embodiment of a system 10 according to the third aspect of the invention, comprising a mobile device 2 in a situation A which may correspond to a reference information generation stage before or during a logistics process. System 10 further comprises a network server 3 connected to mobile device 2 via communication path 23. While processing for performing e.g. a method in accordance with the second aspect of the present invention may be performed at mobile device 2 in situation A, such processing may be performed likewise at server 3 based on information received from mobile device 2 via communication path 23. Thus, mobile device 2 in situation A and/or server 3 are examples of the at least one second apparatus.

System 10 further comprises mobile device 2 in a situation B which may correspond to an earlier stage of a logistics process in which mobile device 2 obtains information indicative of at least one characteristic of franking 1 provided on consignment unit 5. System 10 further comprises a sorting machine 4 schematically illustrated by dashed lines. Mobile device 2 may be removable mounted to the sorting machine 4 via a holder as disclosed above. It is noted that in addition to or alternatively to mobile device 2, sorting machine 4 may comprise or be connected with a camera for capturing images of franking 1. Sorting machine 4 is connected with server 3 via communication path 34 and mobile device 2 B is connected with server 3 via communication path 23 (not explicitly illustrated for situation B). Thus, while processing for performing e.g. a method in accordance with the second aspect of the present invention may be performed at mobile device 2 in situation B and/or at sorting machine 4, such processing may be performed likewise at server 3 based on information received from mobile device 2 via communication path 23 and/or based on information received from sorting machine 4. Therefore, mobile device 2 in situation B, sorting machine 4 and/or server 3 are examples of the at least one first apparatus.

It is noted that while mobile device 2 in situation A corresponds to mobile device 2 in situation B in FIG. 1 for facilitating description of the aspects of the invention, mobile device 2 in situation A and/or mobile device 2 in situation B may be substituted by different apparatuses configured for data processing and/or for acquiring images of franking 1. For example, without limiting the scope of the invention, mobile device 2 in situation A may be substituted by a digital camera connected to a computer (e.g. installed at an earlier stage of a logistics process at a logistics service providing company and/or at a facility of an authorized manufacturer such as the Bundesdruckerei in Germany) and/or mobile device 2 in situation B may be substituted by an apparatus such as a sorting machine and/or a franking machine installed at a suitable stage of a logistics process comprising data processing capabilities for carrying out a method according to the first aspect and comprising and/or being connected with a camera for obtaining images of franking 1. Mobile device 2 may likewise be substituted by a robot and/or drone (e.g. used in a warehouse or different logistics facility) comprising a camera and being configured for performing a method in accordance with the first aspect.

It is noted that any of communication paths 23, 24, 34 of FIG. 1 may be a direct or indirect communication path. For example, any of communication paths 23, 24, 34 of FIG. 1 may comprise one or more hops, for example one or more communication links or communication connections. As mentioned, in the context of the present disclosure, a communication path is to be understood as a (bi-directional) wireless and/or wired communication connection, in particular a 2G/3G/4G/5G cellular wireless connection, a Device-to-Device (D2D) communication path, a (bi-directional) wireless communication connection, in particular a Wireless Local Area Network (WLAN) connection and/or a wired connection including a Local Area Network (LAN) connection, and/or any further wired computer connection, e.g. a bus, in particular a USB connection, and/or in particular an internet connection.

Figure 2:
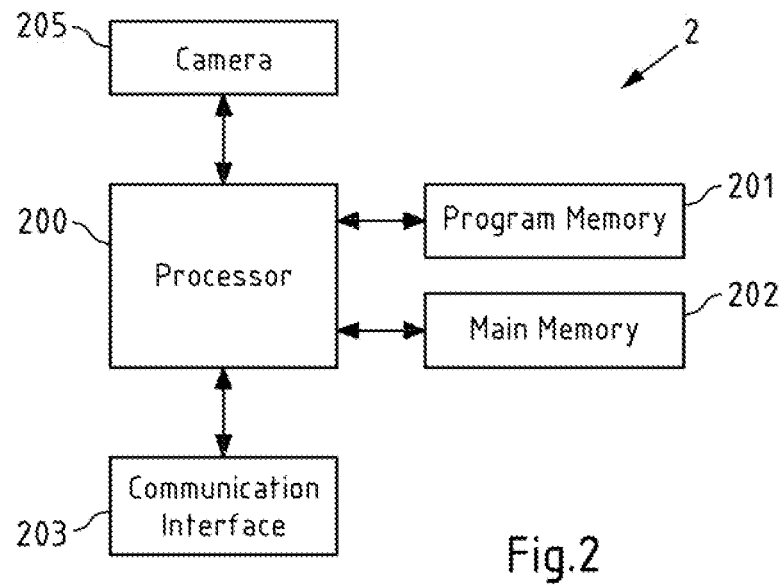
FIG. 2 is a block diagram of an exemplary embodiment of an apparatus according to the first and/or the second aspect of the invention.

FIG. 2 is a block diagram of an exemplary embodiment of mobile device 2 being an example of the at least one first apparatus and/or the at least one second apparatus. In the following, it is assumed that mobile device 2 of FIG. 1 corresponds to mobile device 2 of FIG. 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method according to the first and or second aspect (e.g. the steps of any one embodiment of the disclosed method) or a part thereof (e.g. at least some steps of any one embodiment of the disclosed method) (as for instance further described below with reference to FIGS. 4 and/or 5), when executed on processor 200), and interfaces with a main memory 202. Program memory 201 may also contain an operating system for processor 200 and further data. Some or all of memories 201 and 202 may also be included into processor 200. One of or both of memories 201 and 202 may be fixedly connected to processor 200 or at least partially removable from processor 200, for example in the form of a memory card or stick.

Program memory 201 may for example be a non-volatile memory. The program memory may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

Main memory 202 may for example be a volatile memory. It may for example be a DRAM memory, to give non-limiting example. It may for instance be used as a working memory for processor 200 when executing an operating system and/or programs.

Processor 200 further controls a communication interface 203 configured for communicating via a cellular network (e.g. to transmit and receive cellular radio signals). For example, wireless communication interface 203 may be or may comprise a 2G/3G/4G/5G radio transceiver. Mobile device 2 may use wireless communication interface 203 to transmit information indicative of at least one characteristic of a franking to server 3 and/or to receive reference information indicative of the at least one characteristic of the franking from server 3.

Mobile device 2 further comprises a camera 205 configured to acquire images of franking 1 in situation A and/or in situation B in FIG. 1. Using processor 200 and employing program code stored in program memory 201, mobile device 2 may be configured to derive information indicative of at least one characteristic of franking 1 and may thus obtain this information. Using processor 200 and employing program code stored in program memory 201, mobile device 2 may be configured to receive reference information indicative of the at least one characteristic of franking 1 from network server 3. Mobile device 2 may use processor 200 and may employ program code stored in program memory 201 to then determine whether or not franking 1 is a counterfeit franking and/or a reused franking based on the obtained information and based on the received reference information.

The components 201 to 205 of mobile device 2 may for instance be connected with processor 200 by means of one or more serial and/or parallel busses.

It is to be understood that mobile device 2 may comprise various other components like a user interface for receiving user input.

Figure 3:
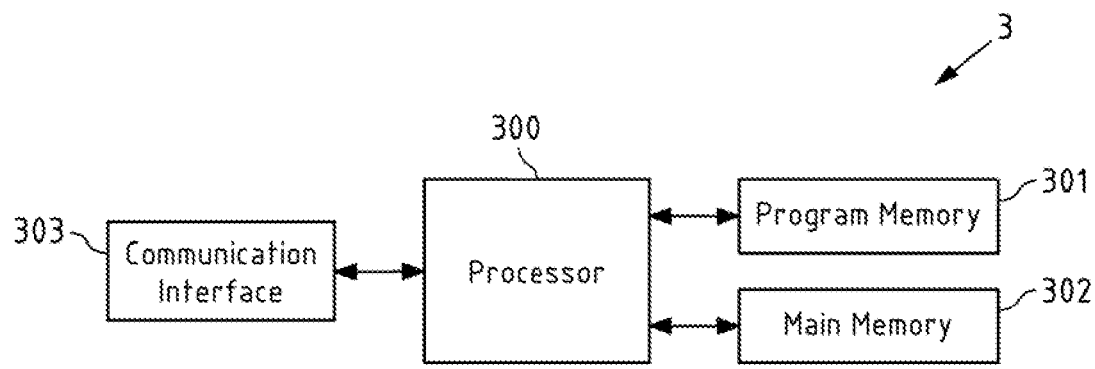
FIG. 3 is a block diagram of a further exemplary embodiment of an apparatus according to the first and/or the second aspect of the invention.

FIG. 3 is a block diagram of an exemplary embodiment of a server 3 which may be a further example of the at least one first apparatus and/or the at least one second apparatus. In the following, it is assumed that server 3 of system 10 of FIG. 1 corresponds to server 3 of FIG. 2.

Server 3 comprises a processor 300. Processor 300 may represent a single processor or two or more processors, which are for instance at least partially coupled, for instance via a bus. Processor 300 executes a computer program code to perform any one embodiment of the disclosed method according to the first and/or the second aspect (e.g. the steps of any one embodiment of the disclosed method) stored in program memory 301 or a part thereof (e.g. at least some steps of any one embodiment of the disclosed method) (as for instance further described below with reference to FIG. 4 and/or FIG. 5), and interfaces with a main memory 302. Accordingly, program memory 301 may contain an operating system for processor 300. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a communication interface 303 which is configured to communicate via a communication network. Server 3 may use communication interface 303 to communicate with external apparatuses such as mobile device 2 (via communication path 23) and/or sorting machine 4 (via communication path 34) of system 10. In the following, it is assumed that communication interface 303 is a wireless or wired communication interface configured for communicating using (bi-directional) communication connections like 2G/3G/4G/5G cellular wireless connections, Device-to-Device (D2D) communication paths, (bi-directional) wireless communication connections such as Wireless Local Area Network (WLAN) connections, or wired computer connections such as Local Area Network (LAN) connections and/or buses including in particular USB connections. For example, server 3 may use communication interface 303 to transmit stored reference information to mobile device 2 of system 10 (e.g. via communication path 23) based on information received from mobile device 2 and/or sorting machine 4 via communication path 23 and/or communication path 34.

The components 301 to 303 of server 3 may for example be connected with processor 300 by means of one or more serial and/or parallel busses.

It is to be understood that server 3 may comprise various other components like a user interface for receiving user input.

Figure 4:
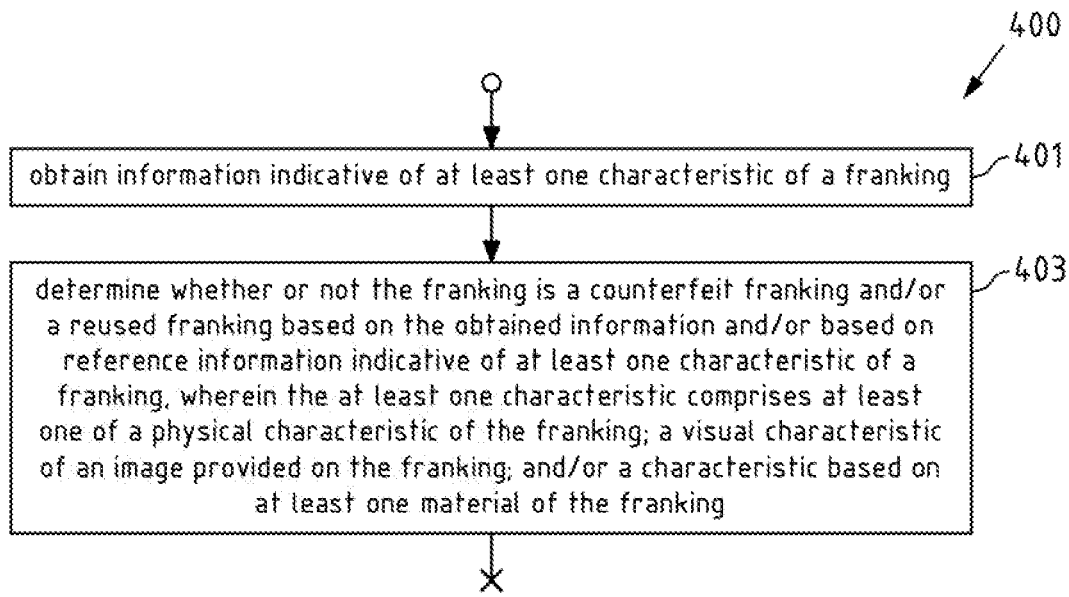
FIG. 4 is a flow chart illustrating an exemplary embodiment of a method according to the first aspect of the invention.

FIG. 4 is a flow chart 400 illustrating an exemplary embodiment of a method according to the first aspect of the invention. Without limiting the scope of the invention, it is assumed in the following that mobile device 2 disclosed above with respect to FIGS. 1 and 2 performs the steps of flow chart 400.

In a step 401, mobile device 2 obtains information indicative of at least one characteristic of a franking. For example, mobile device 2 in situation B of FIG. 1 may to this end acquire an image of franking 1 provided on consignment unit 5. Mobile device 2 may then derive information indicative of a characteristic of the franking from the acquired image employing suitable image processing. It is noted that suitable lighting may be employed when mobile device 2 acquires the image, e.g. UV and/or IR lighting may be provided if presence or absence of a fluorescence ink is determined using mobile device 2. Such lighting may be constantly provided, may be turned on or off manually and/or may be turned on/off by (e.g. wireless) communication from mobile device 2. It is noted that step 401 may be carried out by server 3 which may obtain the information e.g. obtained by mobile device 2 and/or the image acquired by mobile device 2 via communication path 34 and/or via communication path 23.

While step 401 of FIG. 4 is performed by mobile device 2, it is noted that step 401 may be performed in addition/or alternatively by a different apparatus connected to and/or comprising a camera such as a logistics apparatus (e.g. a sorting machine and/or a franking machine) comprising and/or being connected to a camera, and/or a robot and/or drone (an example of a Unmanned Aerial Vehicle) comprising and/or being connected to a camera, e.g. employed at a stage of a logistics process such as in a warehouse. In particular, while mobile device 2 may acquire an image of franking 1, server 3 may obtain information indicative of at least one characteristic of the franking (and may thus perform step 401) by receiving the information in form of an acquired image (image data) and/or information derived from the acquired image from mobile device 2 via communication path 23.

In a step 403, mobile device 2 determines whether or not the franking is a counterfeit franking and/or a reused franking based on the obtained information and/or based on reference information indicative of the at least one characteristic. It is noted that the at least one characteristic comprises or corresponds to any of the categories (physical characteristic, visual characteristic, material characteristic) and examples of characteristics disclosed previously herein.

While step 403 of FIG. 4 is performed by mobile device 2, it is noted that also step 403 may be performed by the different apparatuses mentioned in the context of step 401.

Figure 5:
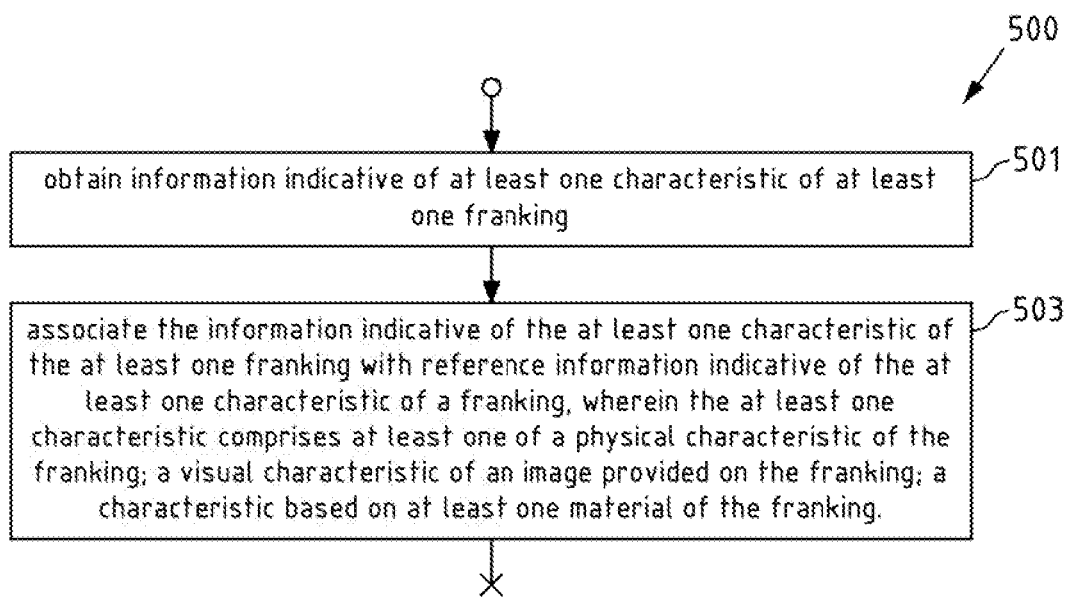
FIG. 5 is a flow chart illustrating an exemplary embodiment of a method according to the second aspect of the invention.

FIG. 5 is a flow chart 500 illustrating an exemplary embodiment of a method according to the second aspect of the invention. Without limiting the scope of the invention, it is assumed in the following that mobile device 2 disclosed above with respect to FIGS. 1 and 2 performs the steps of flow chart 500.

In a step 501, mobile device 2 obtains information indicative of at least one characteristic of at least one franking. For example, mobile device 2 may in this step acquire images of a plurality of frankings. The frankings may be provided on corresponding consignment units (e.g. when step 501 is carried out at an early stage of a logistics process) or may not (yet) be provided to a consignment unit (e.g. when step 501 is carried out at an authorized manufacturer and/or at a stage after the frankings have been obtained from an authorized manufacturer). Mobile device 2 may then derive information indicative of a characteristic of each of the frankings from the acquired images employing suitable image processing. As in case of step 401, suitable lighting may be employed when mobile device 2 acquires the image, e.g. UV and/or IR lighting may be provided if presence or absence of a fluorescence ink is determined using mobile device 2. Further, as in case of step 401, also step 501 may be carried out by server 3 which may obtain the information e.g. obtained by mobile device 2 and/or the image acquired by mobile device 2 via communication path 23.

While step 501 of FIG. 5 is performed by mobile device 2, it is noted that step 501 may be performed in addition/or alternatively by a different apparatus connected to and/or comprising a camera such as generally a data processing apparatus (e.g. a non-portable or portable computer) comprising and/or being connected to a camera, and or the logistics apparatus comprising and/or being connected to a camera, and/or a robot and/or drone (an example of a Unmanned Aerial Vehicle) comprising and/or being connected to a camera, e.g. employed at a stage of a logistics process such as in a warehouse. In particular, while mobile device 2 may acquire images of franking 1, server 3 may obtain corresponding information indicative of at least one characteristic of the frankings (and may thus perform step 501) by receiving the information in form of acquired images (image data) and/or information derived from the acquired image from mobile device 2 via communication path 23.

In a step 503, mobile device 2 associates the information indicative of the at least one characteristic of the at least one franking with reference information indicative of the at least one characteristic of a franking. It is noted that the at least one characteristic comprises or corresponds to any of the categories (physical characteristic, visual characteristic, material characteristic) and examples of characteristics disclosed previously herein.

While step 503 of FIG. 5 is performed by mobile device 2, it is noted that also step 503 may likewise be performed by the different apparatuses mentioned in the context of step 501.

Figure 6:
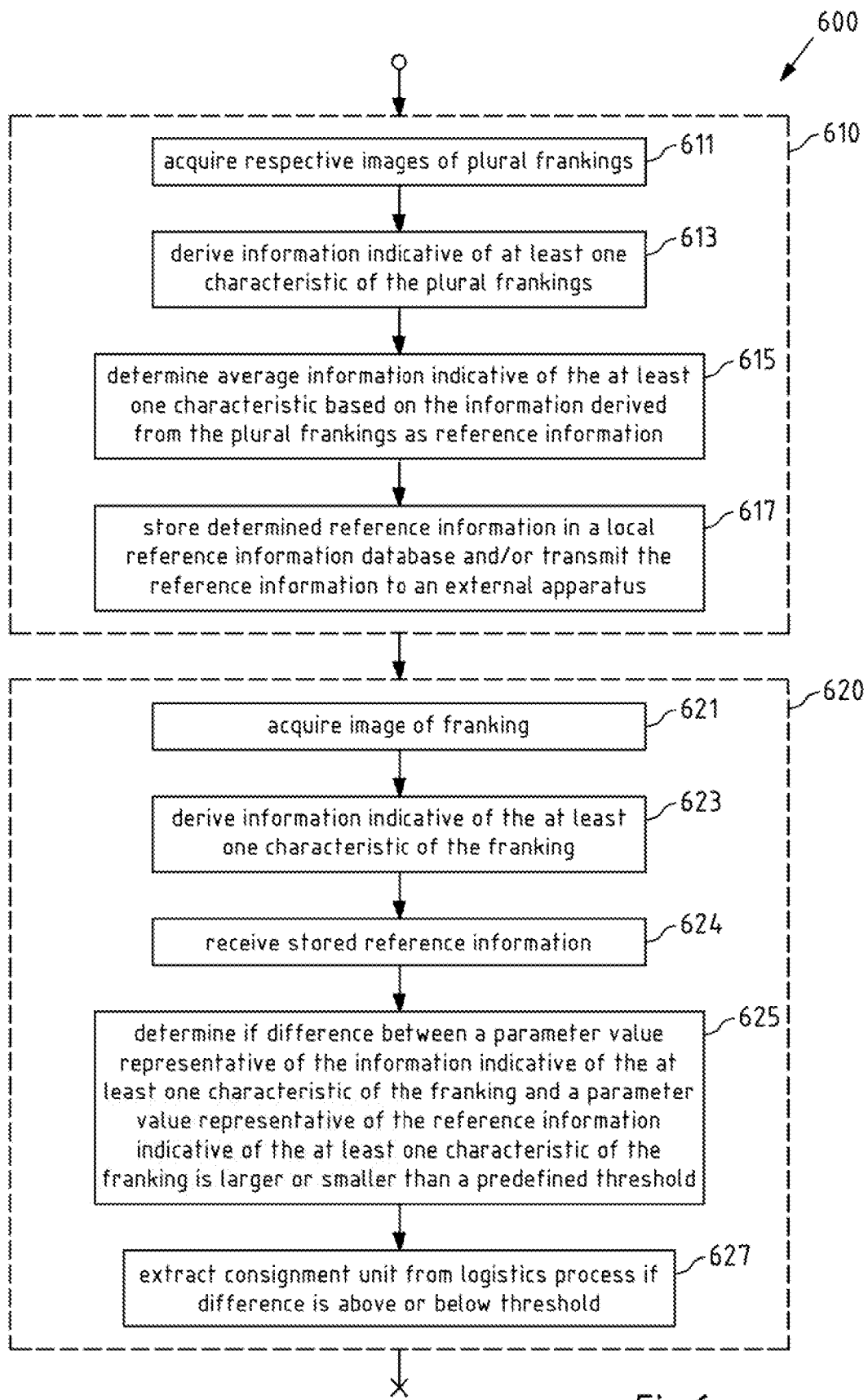
FIG. 6 is a flow chart illustrating an exemplary embodiment of a method according to the invention.

FIG. 6 is a flow chart 600 illustrating an exemplary embodiment of the invention. Thereby, stage 610 illustrates example method steps in accordance with the second aspect of the invention while stage 620 illustrates example method steps in accordance with the first aspect of the invention. Without limiting the scope of the invention, it is assumed in the following that mobile device 2 disclosed above with respect to FIGS. 1 and 2 performs the steps of flow chart 600. It is noted that while the present description refers to mobile device 2 performing stages 610 and 620, in particular different mobile devices may perform stage 610 and 620.

In step 611 of stage 610, mobile device 2 acquires respective images of plural frankings and derives information indicative of at least one characteristic of the plural frankings in step 613. In this way, mobile device 2 obtains information indicative of at least one characteristic of at least one franking. For example, mobile device 2 may derive a resolution at which a respective image is printed on each of the frankings as a visual characteristic of each of the frankings. Mobile device 2 may then determine average information indicative of the at least one characteristic based on the information derived from the plural frankings as reference information at step 615. In this way, mobile device 2 provides averaged information as reference information indicative of the at least one characteristic of the at least one franking based on information indicative of the at least one characteristic of a plurality of frankings.

Mobile device 2 may then store the reference information in a local reference information database for offline access when inspecting frankings and/or may transmit the reference information to an external apparatus, e.g. to server 3 via communication path 23, e.g. to be stored for online access in step 617.

At stage 620, mobile device 2 (the same mobile device or a different mobile device) carries out method steps for determining whether or not the franking is a genuine franking from an authorized manufacturer. Thus, in step 621, mobile device 2 acquires an image of a franking under inspection and derives the information indicative of at least one characteristic of the franking in step 623. In step 624, mobile device 2 receives the stored reference information e.g. from the online database stored at server 3 via communication path 23. It is noted that step 624 may be performed earlier, e.g. before any of steps 621 or 623.

In step 625, mobile device 2 determine if a difference between a parameter value representative of the information indicative of the at least one characteristic of the franking and a parameter value representative of the reference information indicative of the at least one characteristic of the franking is larger or smaller than a predefined threshold. Mobile device 2 thus determines whether or not the franking is a counterfeit franking based on the information or based on the information and based on reference information indicative of at least one characteristic of a franking.

For example, mobile device 2 may determine whether or not a printing resolution for printing an image onto the franking under inspection is smaller than a printing resolution employed by a printer of an authorized manufacturer (which may correspond to the reference information determined in step 615) by a predefined value. In the affirmative case, the franking may be determined to be a counterfeit franking. In case mobile device 2 is used in combination with a logistics process at an early process, a consignment unit corresponding to the franking found to be counterfeit may than be extracted from the logistics process in step 627.

Figure 7:
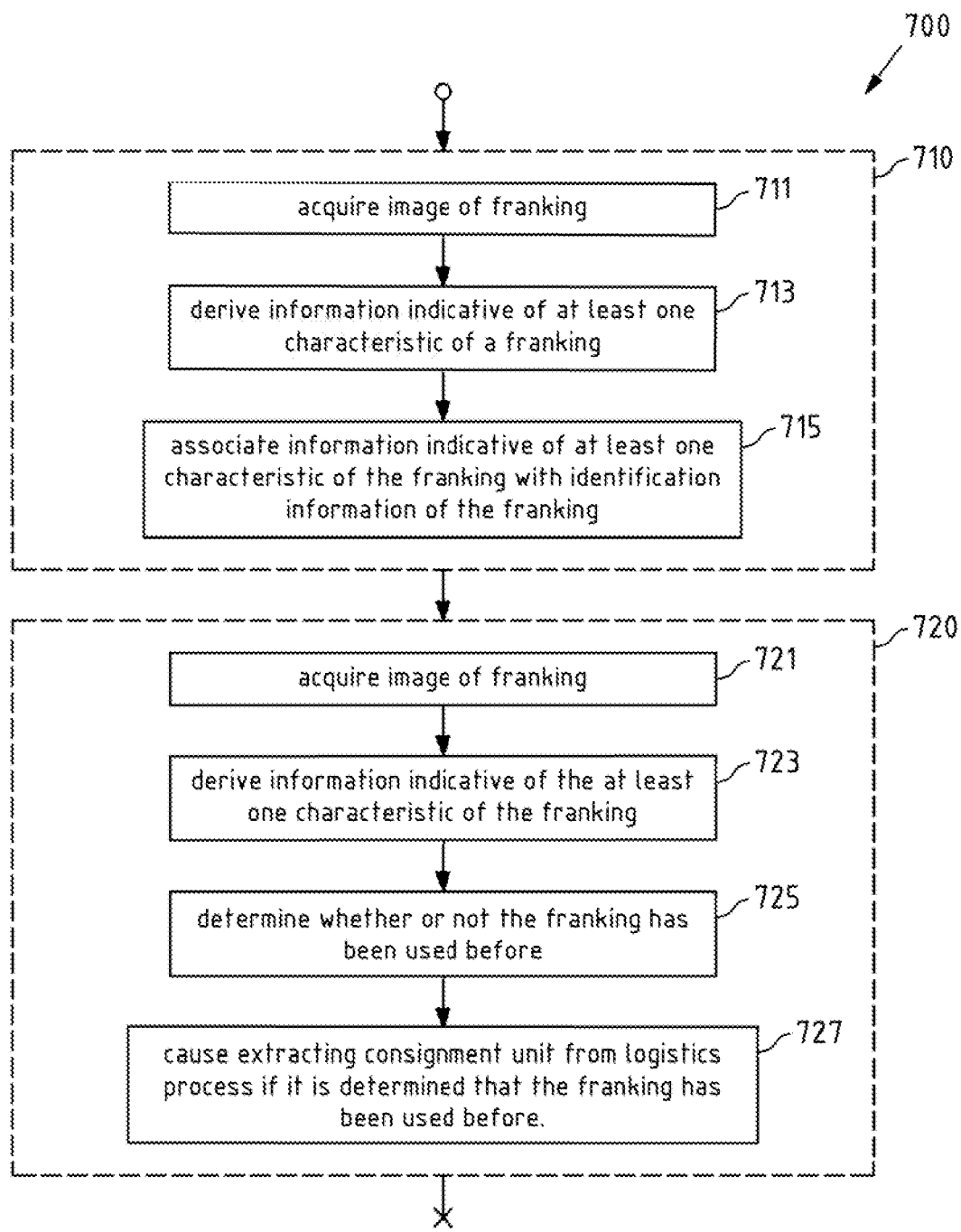
FIG. 7 is a flow chart illustrating a further exemplary embodiment of a method according to the invention.

FIG. 7 is a flow chart 700 illustrating an exemplary embodiment of the invention. Thereby, stage 710 illustrates example method steps in accordance with the second aspect of the invention while stage 720 illustrates example method steps in accordance with the first aspect of the invention. Without limiting the scope of the invention, it is assumed in the following that mobile device 2 disclosed above with respect to FIGS. 1 and 2 performs the steps of flow chart 700. It is noted that while the present description refers to mobile device 2 performing stages 710 and 720, in particular different mobile devices may perform stage 710 and 720.

In step 711 of stage 10, mobile device 2 acquires an image of a franking and derives information indicative of at least one characteristic of the franking in stage 713. For example, mobile device 2 may derive a particular surface structure from the franking which may serve for uniquely identifying the particular franking (i.e. may serve as fingerprint of this individual franking). As mentioned, in an exemplary embodiment, a characteristic information generating method configured for bijective mapping an image to a unique sequence of characters, is employed to convert the derived information into a unique sequence of characters. Employing such mapping may provide the advantage that instead of storing and/or having to communicate large image data, only the unique sequence may have to be stored and/or communicated. Then, in step 715, mobile device 2 associates the information indicative of at least one characteristic of the franking with identification information of the franking. For example, mobile device 2 may derive identification information of the franking e.g. based on a sequence number of the franking recognizable for mobile device 2 via an optical character recognition (OCR) algorithm. Mobile device 2 may then store the information indicative of at least one characteristic of the franking in association with the identification information in a local reference information database for offline access when inspecting frankings and/or may transmit the information indicative of at least one characteristic of the franking in association with (e.g. in a same transmission or in associated transmissions) the identification information to an external apparatus, e.g. to server 3 via communication path 23, e.g. to be stored for online access in step 715.

At stage 720, mobile device 2 (the same mobile device or a different mobile device) carries out method steps for determining whether or not the franking has been used already and is thus an illegally reused franking. Thus, in step 721, mobile device 2 acquires an image of a franking under inspection and derives the information indicative of at least one characteristic of the franking in step 723. For example, mobile device 2 may derive a particular surface structure from the franking under inspection. Mobile device 2 may then convert the derived surface structure into a sequence of characters using the mentioned characteristic information generating method. Further, mobile device 2 may derive identification information from the franking, e.g. a sequence number which may be derivable e.g. via optical character recognition (OCR) by mobile device 2.

Based at least on the acquired information indicative of the at least one characteristic of the franking, mobile device 2 determines whether or not franking has been used before. For example, step 715 may be performed at an early stage of a logistic process such that the information indicative of the characteristic and the identification information of the franking may be stored in association when the franking is used for the first time. In such case, mobile device 2 may for example determine at step 725 whether or not the information indicative of the characteristic and the identification information of the franking is already stored in association in a corresponding database. In the affirmative case, the method may proceed to step 727 where mobile device 2 may cause e.g. a logistics apparatus to extract the corresponding consignment unit from the logistics process.

Alternatively, step 715 may be performed at stage before a logistic process e.g. in combination with or after manufacturing of the franking. Information indicative of the characteristic and the identification information of the franking may then be stored in association also with further information (e.g. a flag) indicating whether or not the franking has not been used, or has been used. In such case, mobile device 2 may for example, based on the acquired information indicative of the at least one characteristic of the franking, whether or not the further information indicates that the franking has been already used. Again, in the affirmative case, the method may proceed to step 727 where mobile device 2 may cause e.g. a logistics apparatus to extract the corresponding consignment unit from the logistics process.

The following example embodiments of the invention are also disclosed:

Embodiment 1

A method performed by at least one first apparatus, the method comprising:
  a. obtaining or causing obtaining information indicative of at least one characteristic of a franking;
  b. determining or causing determining whether or not the franking is a counterfeit franking and/or a reused franking based on the obtained information or based on the obtained information and based on reference information indicative of at least one characteristic of a franking;
  c. wherein the at least one characteristic comprises at least one of
    a physical characteristic of the franking;
    a visual characteristic of an image provided on the franking;
    a characteristic based on at least one material of the franking.

Embodiment 2

The method according to embodiment 1, wherein the reference information comprises or corresponds to at least one of the following:
  average information indicative of the at least one characteristic of the franking;
  at least one unique characteristic of the franking, in particular stored in advance.

Embodiment 3

The method according to any of embodiments 1 or 2, wherein the at least one first apparatus comprises and/or is connected with a camera.

Embodiment 4

The method according to any of embodiments 1 to 3, wherein obtaining information indicative of at least one characteristic of a franking comprises acquiring or causing acquiring an image of at least part of the franking.

Embodiment 5

The method according to any of embodiments 1 to 4, further comprising:
  converting or causing converting the at least one characteristic of the franking into a unique sequence of characters (e.g. letters and/or numbers) employing a bijective mapping algorithm.

Embodiment 6

The method according to any of embodiments 1 to 5, wherein a physical characteristic of the franking comprises at least one of the following:
  a physical characteristic of a cutting edge of the franking, in particular of a postage stamp;
  a geometrical shape of the franking;
  one or more die cuts present within a body of the franking;
  differences in geometry of perforations present along different sides of the franking;
  evenness of edges of the franking;
  damage of the franking.

Embodiment 7

The method according to embodiment 6, wherein a physical characteristic of a cutting edge of a franking comprises one or more of the following and/or is representative of one or more of the following:
  presence or absence of a perforation of the cutting edge;
  type and/or geometry of perforation of the cutting edge;
  whether or not the cutting edge is die-cut;
  whether or not the cutting edge is of serpentine die-cut shape, in particular having peak-type and/or valley-type corners, in particular being of sawtooth-type and/or of rounded type;
  sharpness of the cutting edge;
  geometry of the cutting edge.

Embodiment 8

The method according to any of embodiments 1 to 7, wherein a visual characteristic of an image provided on the franking comprises or is represented by at least one of the following:
  image resolution;
  span of used colors;
  image sharpness;
  image contrast;
  printing quality on pixel level;
  printer fingerprint on pixel level;
  completeness of an image;
  position of image with respect to the franking;
  image damage;
  image deterioration.

Embodiment 9

The method according to any of embodiments 1 to 8, wherein the characteristic based on the at least one material of the franking comprises or corresponds to at least one of:
  a structure, in particular to a surface structure, of a paper used for manufacturing the franking;
  presence and/or absence of a fluorescence and/or super-fluorescent ink in at least part of an image provided on a surface of the franking;
  a color appearance of the franking depending on a wavelength of light used for illuminating the franking;
  presence of at least one unexpected material.

Embodiment 10

The method according to any of embodiments 1 to 9, wherein an unexpected material comprises a cleaning material for cleaning postmarks.

Embodiment 11

The method according to any of embodiments 1 to 10, wherein obtaining information indicative of at least one characteristic of a franking comprises
  acquiring at least one image of a surface of the franking in an ultraviolet and/or in an infrared wavelength range.

Embodiment 12

The method according to any of embodiments 1 to 11, wherein obtaining information indicative of at least one characteristic of a franking comprises
  simultaneously acquiring at least one image of a surface of the franking in an ultraviolet and in an infrared wavelength range.

Embodiment 13

The method according to any of embodiments 1 to 12, wherein obtaining the label information and/or the reference label comprises:
  receiving or causing receiving the reference information indicative of the at least one characteristic of a franking from at least one external apparatus in association with identification information of the franking, in particular via a network connection.

Embodiment 14

The method according to any of embodiments 1 to 13, wherein in the franking is a franking provided on a consignment unit.

Embodiment 15

The method according to embodiment 14, wherein the consignment unit is a parcel or a letter

Embodiment 16

The method according to any of embodiments 1 to 15, wherein the franking is an uncanceled and/or precanceled postage stamp.

Embodiment 17

The method according to any of embodiments 1 to 16, wherein the franking is a self-adhesive postage stamp or a postage stamp comprising adhesive gum.

Embodiment 18

The method according to any of embodiments 1 to 17, wherein determining whether or not the franking is a counterfeit franking and/or a reused franking based on the obtained information or based on the obtained information and based on the reference information indicative of at least one characteristic of a franking comprises:
comparing or causing comparing the information indicative of the at least one characteristic of the franking to reference information indicative of the at least one characteristic of the franking.

Embodiment 19

The method according to embodiment 18, wherein comparing the information indicative of the at least one characteristic of the franking to reference information indicative of the at least one characteristic of the franking comprises:
determining or causing determining whether or not a difference between a parameter value representative of the information indicative of the at least one characteristic of the franking and a parameter value representative of the reference information indicative of the at least one characteristic of the franking is larger or smaller than a predefined threshold.

Embodiment 20

The method according to any of embodiments 1 to 19, wherein determining whether or not the franking is a counterfeit franking and/or a reused franking based on the obtained information or based on the obtained information and based on reference information indicative of at least one characteristic of a franking comprises or corresponds to one or more of:
comparing or causing comparing information indicative of a physical characteristic of a cutting edge of the franking to reference information indicative of the physical characteristic of a cutting edge of a corresponding franking;
comparing or causing comparing information indicative of a visual characteristic of an image provided on the franking to reference information indicative of the visual characteristic of an image provided on a corresponding franking;
comparing or causing comparing information indicative of a characteristic based on the at least one material of the franking to reference information indicative of the characteristic based on the at least one material of the franking.

Embodiment 21

The method according to any of embodiments 1 to 20, further comprising:
extracting or causing extracting a consignment unit to which the franking is applied from a logistics process if it is determined that the franking is a counterfeit franking and/or has been used before.

Embodiment 22

A method performed by at least one second apparatus, the method comprising:
obtaining or causing obtaining information indicative of at least one characteristic of at least one franking;
associating or causing associating the information indicative of the at least one characteristic of the at least one franking with reference information indicative of the at least one characteristic of a franking;
wherein the at least one characteristic comprises at least one of
a physical characteristic of the franking;
a visual characteristic of an image provided on the franking;
a characteristic based on at least one material of the franking.

Embodiment 23

The method according to embodiment 22, wherein associating the information indicative of the at least one characteristic of the at least one franking with reference information indicative of the at least one characteristic of a franking comprises at least one of:
storing or causing storing the information indicative of the at least one characteristic of the at least one franking as reference information in association with identification information of the respective at least one franking;
providing or causing providing the information indicative of the at least one characteristic of the at least one franking as reference information in association with identification information of the respective at least one franking to be accessible by the at least one external apparatus.

Embodiment 24

The method according to any of embodiments 22 to 23, wherein associating the information indicative of the at least one characteristic of the at least one franking with reference information indicative of the at least one characteristic of a franking comprises:
providing or causing providing averaged information as reference information indicative of the at least one characteristic of the at least one franking based on information indicative of the at least one characteristic of a plurality of frankings.

Embodiment 25

The method according to embodiment 24, wherein providing averaged information comprises employing or causing employing a machine learning algorithm, in particular based on artificial intelligence.

Embodiment 26

The method according to any of embodiments 1 to 25, wherein the at least one first apparatus and/or the at least one second apparatus corresponds to and/or comprises at least one of the following:
an apparatus configured for a logistics process;
a robot;
an Unmanned Aerial Vehicle;
a mobile device;
a network server.

Embodiment 27

The method according to embodiment 26, wherein the at least one first apparatus and/or the at least one second apparatus corresponds to and/or comprises a sorting machine and/or a franking machine, in particular comprising a holder for a mobile device.

Embodiment 28

The method according to any of embodiments 24 to 27, wherein a mobile device corresponds to or comprises at least one of:
a smartphone;
a tablet computer;
a laptop.

Embodiment 29

The method according to any of embodiments 1 to 28, wherein the at least one first apparatus corresponds to and/or comprises a sorting machine and/or a franking machine comprising a holder configured for holding a mobile device with a digital camera such that an angle between an optical axis of the digital camera and a surface of a franking of a consignment unit processed by the logistics apparatus is 10° to 95°, in particular 12° to 93°, in particular 15° to 90°.

Embodiment 30

The method according to any of embodiments 1 to 29, wherein the apparatus configured for a logistics process, the robot the Unmanned Aerial Vehicle and/or the mobile device comprises a camera.

Embodiment 31

The method according to any of embodiments 1 to 30, wherein the method comprises:
a. storing or causing storing the reference information; and/or providing or causing providing the reference information to be accessible by the at least one external apparatus.

Embodiment 32

The method according to any of embodiments 1 to 31, wherein the communication path corresponds to or comprises a (bi-directional) wireless and/or wired communication connection, in particular a 2G/3G/4G/5G cellular wireless connection, a Device-to-Device (D2D) communication path, a (bi-directional) wireless communication connection, in particular a Wireless Local Area Network (WLAN) connection and/or a wired connection including a Local Area Network (LAN) connection, and/or any further wired computer connection, e.g. a bus, in particular a USB connection, and/or in particular an internet connection.

Embodiment 33

A computer program, the computer program when executed by a processor causing an apparatus to perform and/or control a method according to any of the preceding embodiments.

Embodiment 34

An apparatus or a system comprising a plurality of apparatuses, the apparatus or system configured to perform and/or control or comprising respective means for performing and/or controlling a method according to any of embodiments 1 to 32.

In the specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible.

Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

All references, including publications, patent applications, and patents cited herein are hereby incorporated by reference to the same extent as if each reference were individually and specifically indicated to be incorporated by reference and were set forth in its entirety herein.

The invention claimed is:

1. An apparatus or system, the apparatus or system comprising at least one processor and at least one memory including computer program code, the at least one memory and the computer program code configured to, with the at least one processor, cause an apparatus or system at least to perform and/or control a method comprising:
obtaining or causing obtaining information indicative of at least one characteristic of a franking;
determining or causing determining whether or not the franking is a counterfeit franking and/or a reused franking based on the obtained information and based on reference information indicative of at least one characteristic of a franking;
wherein the at least one characteristic comprises at least one of
a physical characteristic of the franking;
a visual characteristic of an image provided on the franking;
a characteristic based on at least one material of the franking; and
wherein the reference information comprises or corresponds to at least one of the following:
average information indicative of the at least one characteristic of the franking;
at least one unique characteristic of the franking, the unique characteristic uniquely identifying the individual franking.

2. The apparatus or system according to claim 1, wherein the apparatus or system comprises and/or is connected with a camera.

3. The apparatus or system according to claim 1, wherein obtaining information indicative of at least one characteristic of a franking comprises acquiring or causing acquiring an image of at least part of the franking.

4. The apparatus or system according to claim 1, wherein a physical characteristic of the franking comprises at least one of the following:
a physical characteristic of a cutting edge of the franking;
a geometrical shape of the franking;
one or more die cuts present within a body of the franking;
differences in geometry of perforations present along different sides of the franking;
evenness of edges of the franking;
damage of the franking.

5. The apparatus or system according to claim 1, wherein a visual characteristic of an image provided on the franking comprises or is represented by at least one of:
image resolution;
span of used colors;
image sharpness;
image contrast;
printing quality on pixel level;
printer fingerprint on pixel level;
completeness of an image;
position of image with respect to the franking;
image damage;
image deterioration.

6. The apparatus or system according to claim 1, wherein the characteristic based on the at least one material of the franking comprises or corresponds to at least one of:
a structure of a paper used for manufacturing the franking;
presence and/or absence of a fluorescence and/or superfluorescent ink in at least part of an image provided on a surface of the franking;
a color appearance of the franking depending on a wavelength of light used for illuminating the franking;
presence of at least one unexpected material.

7. The apparatus or system according to claim 1, wherein obtaining information indicative of at least one characteristic of a franking comprises acquiring at least one image of a surface of the franking in an ultraviolet and/or in an infrared wavelength range.

8. The apparatus or system according to claim 1, the method further comprising:
receiving or causing receiving the reference information indicative of the at least one characteristic of a franking from at least one external apparatus in association with identification information of the franking.

9. The apparatus or system according to claim 1, wherein determining whether or not the franking is a counterfeit franking and/or a reused franking based on the obtained information or based on the obtained information and based on the reference information indicative of at least one characteristic of a franking comprises:
comparing or causing comparing the information indicative of the at least one characteristic of the franking to reference information indicative of the at least one characteristic of the franking.

10. The apparatus or system according to claim 1, the method further comprising:
extracting or causing extracting a consignment unit to which the franking is applied from a logistics process if it is determined that the franking is a counterfeit franking and/or has been used before.

11. The apparatus or system according to claim 1, wherein the apparatus or system corresponds to and/or comprises at least one of the following:
an apparatus configured for a logistics process;
a robot;
an Unmanned Aerial Vehicle;
a mobile device;
a network server.

12. The apparatus or system according to claim 1, wherein the apparatus or system corresponds to and/or comprises a sorting machine and/or a franking machine.

13. The apparatus or system according to claim 1, wherein determining whether or not the franking is a counterfeit franking and/or a reused franking based on the obtained information or based on the obtained information and based on reference information indicative of at least one characteristic of a franking comprises or corresponds to one or more of:
comparing or causing comparing information indicative of a physical characteristic of a cutting edge of the franking to reference information indicative of the physical characteristic of a cutting edge of a corresponding franking;
comparing or causing comparing information indicative of a visual characteristic of an image provided on the franking to reference information indicative of the visual characteristic of an image provided on a corresponding franking;

comparing or causing comparing information indicative of a characteristic based on the at least one material of the franking to reference information indicative of the characteristic based on the at least one material of the franking.

14. An apparatus or system, the apparatus or system comprising at least one processor and at least one memory including computer program code, the at least one memory and the computer program code configured to, with the at least one processor, cause an apparatus or system at least to perform and/or control a method comprising:
   obtaining or causing obtaining information indicative of at least one characteristic of at least one franking;
   associating or causing associating the information indicative of the at least one characteristic of the at least one franking with reference information indicative of the at least one characteristic of a franking;
   wherein the at least one characteristic comprises at least one of
      a physical characteristic of the franking;
      a visual characteristic of an image provided on the franking;
      a characteristic based on at least one material of the franking; and
   wherein the reference information comprises or corresponds to at least one of the following:
      average information indicative of the at least one characteristic of the franking;
      at least one unique characteristic of the franking, the unique characteristic uniquely identifying the individual franking.

15. The apparatus or system according to claim 14, wherein associating the information indicative of the at least one characteristic of the at least one franking with reference information indicative of the at least one characteristic of a franking comprises at least one of:
   storing or causing storing the information indicative of the at least one characteristic of the at least one franking as reference information in association with identification information of the respective at least one franking;
   providing or causing providing the information indicative of the at least one characteristic of the at least one franking as reference information in association with identification information of the respective at least one franking to be accessible by at least one external apparatus.

16. The apparatus or system according to claim 14, wherein associating the information indicative of the at least one characteristic of the at least one franking with reference information indicative of the at least one characteristic of a franking comprises:
   providing or causing providing averaged information as reference information indicative of the at least one characteristic of the at least one franking based on information indicative of the at least one characteristic of a plurality of frankings.

17. The apparatus or system according to claim 16, wherein providing averaged information comprises
   employing or causing employing a machine learning algorithm.

18. The apparatus or system according to claim 14, wherein the apparatus or system corresponds to and/or comprises at least one of the following:
   an apparatus configured for a logistics process;
   a robot;
   an Unmanned Aerial Vehicle;
   a mobile device;
   a network server.

19. The apparatus or system according to claim 14, wherein the apparatus or system corresponds to and/or comprises a sorting machine and/or a franking machine.

20. A method performed by at least one apparatus, the method comprising:
   obtaining or causing obtaining information indicative of at least one characteristic of a franking;
   determining or causing determining whether or not the franking is a counterfeit franking and/or a reused franking based on the obtained information and based on reference information indicative of at least one characteristic of a franking;
   wherein the at least one characteristic comprises at least one of
      a physical characteristic of the franking;
      a visual characteristic of an image provided on the franking;
      a characteristic based on at least one material of the franking;
   wherein the reference information comprises or corresponds to at least one of the following:
      average information indicative of the at least one characteristic of the franking;
      at least one unique characteristic of the franking, the unique characteristic uniquely identifying the individual franking.

21. A method performed by at least one apparatus, the method comprising:
   obtaining or causing obtaining information indicative of at least one characteristic of at least one franking;
   associating or causing associating the information indicative of the at least one characteristic of the at least one franking with reference information indicative of the at least one characteristic of a franking;
   wherein the at least one characteristic comprises at least one of
      a physical characteristic of the franking;
      a visual characteristic of an image provided on the franking;
      a characteristic based on at least one material of the franking;
   wherein the reference information comprises or corresponds to at least one of the following:
      average information indicative of the at least one characteristic of the franking;
      at least one unique characteristic of the franking, the unique characteristic uniquely identifying the individual franking.

22. A non-transitory computer readable storage medium in which a computer program is stored, the computer program when executed by a processor causing an apparatus or system to perform and/or control a method comprising:
   obtaining or causing obtaining information indicative of at least one characteristic of a franking;
   determining or causing determining whether or not the franking is a counterfeit franking and/or a reused franking based on the obtained information and based on reference information indicative of at least one characteristic of a franking;
   wherein the at least one characteristic comprises at least one of
      a physical characteristic of the franking;
      a visual characteristic of an image provided on the franking;
      a characteristic based on at least one material of the franking;

wherein the reference information comprises or corresponds to at least one of the following:
　average information indicative of the at least one characteristic of the franking;
　at least one unique characteristic of the franking, the unique characteristic uniquely identifying the individual franking.

23. A non-transitory computer readable storage medium in which a computer program is stored, the computer program when executed by a processor causing an apparatus or system to perform and/or control a method comprising:
　obtaining or causing obtaining information indicative of at least one characteristic of at least one franking;
　associating or causing associating the information indicative of the at least one characteristic of the at least one franking with reference information indicative of the at least one characteristic of a franking;
　wherein the at least one characteristic comprises at least one of
　　a physical characteristic of the franking;
　　a visual characteristic of an image provided on the franking;
　　a characteristic based on at least one material of the franking;
　wherein the reference information comprises or corresponds to at least one of the following:
　　average information indicative of the at least one characteristic of the franking;
　　at least one unique characteristic of the franking, the unique characteristic uniquely identifying the individual franking.

\* \* \* \* \*